Patented Dec. 15, 1931

1,836,430

UNITED STATES PATENT OFFICE

JAMES BADDILEY AND ERNEST CHAPMAN, OF BLACKLEY, MANCHESTER, ENGLAND, ASSIGNORS TO BRITISH DYESTUFFS CORPORATION LIMITED, OF BLACKLEY, MANCHESTER, ENGLAND

DETERGENT, CLEANSING AND POLISHING COMPOSITION

No Drawing. Application filed September 9, 1927, Serial No. 218,568, and in Great Britain September 21, 1926.

In the manufacture of detergent compositions, it has heretofore been proposed to use materials of very many different types. Among these materials are sulphonated animal or vegetable oils or greases; and sodium compounds made from them; the word "sulphonated" being here used broadly to describe the products of reaction of sulphuric acid with the fatty oil. Sulphonated castor oil, or turkey red oil, is one of these preparations often used in detergents. It has also been proposed to use sulphonated naphthalenes in detergent compositions. Sulphonated derivatives of petroleum, however, although cheap and plentiful in sludge acid, have not been considered suitable for use in detergents. German Patent 336,558 mentions such a use but states that "sulpho acids" derived from petroleum oils are practically without utility in this connection.

We have now discovered that certain complex sulphonic acid preparations and their salts, belonging to a group of substances which are employed as wetting-out agents for textiles or other fibrous materials, have valuable applications as cleaning agents for ordinary surfaces, for example, tiles, walls, stoneware, glass metals, painted or polished surfaces and the like. The wetting-out agents which are employed in textile and dyeing arts are bodies which when added to aqueous liquids give free penetration of textile fibers. When added to dyestuff powders, these agents facilitate solution or admixture with water and prevent the powder balling or floating on the water. In certain prior and copending applications, Ser. Nos. 195,585, filed May 31, 1927 and 205,833, filed July 14, 1927, we have described and claimed certain new wetting-out agents. In Ser. No. 195,585 these new wetting-out agents are prepared by sulphonating certain petroleum oil fractions and then condensing with various alcohols. Alternatively, the mineral oil fraction may be first alkylated and then sulphonated. The following examples are illustrative of the methods given in Specification Ser. No. 195,585 of preparing the wetting-out agent.

*Example I.*—84 parts of a petroleum fraction obtained by the usual commercial process of extracting Borneo petroleum with liquid sulphur dioxide and having a boiling range of 150°–300° C., are added to 92 parts of 100 per cent sulphuric acid and maintained at a temperature of 60–65° C. for three hours with stirring. The temperature is then raised to 120–130° C. and a mixture of 76 parts isopropyl alcohol and 53 parts of sulphuric acid 96 per cent is added in the course of 30 minutes. After heating for about three hours longer, the reaction is complete. Insoluble oil is separated and the product is isolated by adding lime and converting into the sodium salt in the usual manner. After evaporation to dryness and grinding, the product is a light gray powder easily soluble in water, and showing, even at a dilution below 0.5 per cent, remarkable wetting-out properties.

*Example II.*—63 parts of the petroleum fraction used in Example I are added during one hour to 68 parts weak fuming sulphuric acid (101.5 per cent) with stirring and the temperature is maintained at 60–65° C. during three hours. After allowing to cool and settle, unsulphonated oil (about 20 parts) is separated. The remaining sulphonation mixture is warmed to 100–105° C. and a mixture of 18 parts of isopropyl alcohol and 15 parts sulphuric acid is added during 10 minutes with stirring under reflux. Heating at 100–105° C. is continued for three hours. After cooling, the mixture is poured into water, neutralized with lime and the product isolated as a sodium salt after treatment with sodium carbonate in the usual manner. About 72 parts of a brownish gray powder are obtained, which possesses wetting-out properties similar to the product described in Example I.

In the other acknowledged copending application Ser. No. 205,833, there is disclosed wetting-out agents, having equally advantageous properties, prepared by sulphonation only; the alkylating treatment being omitted. In this case however a petroleum oil fraction having a somewhat higher boiling range is used. The boiling range of such petroleum fraction should be above 200° C., if the best results are to be obtained. The following examples are illustrative of the methods disclosed in Serial No. 205,833 for preparing the wetting-out agent.

*Example III.*—40 parts of that portion of the oil extracted from Borneo petroleum by means of liquid sulphur dioxide (Edeleanu process) which boils between 275–300° C. is added to 74 parts of monohydrate or weak oleum (101.5 per cent) during 1 hour with stirring. After a further hour, the mixture is warmed to 60–65° C. for four hours with continuous stirring. After allowing to settle, the upper layer is poured into water, limed out, and then treated with just the necessary amount of sodium carbonate to convert the product into the sodium salt. The aqueous solution, on evaporation, leaves 49 parts of a light colored neutral product, which shows remarkable wetting-out properties in a solution of about 1 per cent concentration.

*Example IV.*—That fraction of the oil specified above, boiling at 260–275° C., is sulphonated and worked up as described in Example III. The product possesses wetting-out properties only slightly inferior to those shown by the product from the previous Example III.

We have found that these complex sulphonic acids derived from petroleum oil as described in the above-identified copending applications, are good detergents. The present application relates to detergent, cleaning and polishing compositions containing such complex sulphonic acids. In the term "complex sulphonic acids," we include the sulphonated alkylated derivatives of such mineral oil fractions obtainable by sulphonating such mineral oil fractions as are capable of sulphonation and alkylating by condensing the products with an alcohol, and the sulphonated derivatives of high boiling mineral oil fractions obtainable by sulphonating high boiling petroleum oil fractions having a boiling range above 200° C.

The portion of a mineral oil soluble in and extracted by liquid $SO_2$ is substantially free from naphthenes and paraffin hydrocarbons, and contains aromatic and unsaturated hydrocarbons, as well as some other ill-identified bodies. The portion of such an extract having a boiling range above 150° C. is substantially free from low boiling aromatics such as benzene, toluene and xylenes, if these be present in the mineral oil, but has an enriched content of higher boiling aromatics, for instance aromatic hydrocarbons with side chains of two or more carbon atoms, and of the higher boiling unsaturated hydrocarbons. When such minerail oil fractions are treated with sulphuric acid complex reactions take place, the nature of which is not known. The particular composition of the reaction product is immaterial for the present purposes. The discovery which we have made is that these reaction products possess valuable and advantageous properties as detergents.

According to our present invention, the free sulphonic acids or their soluble salts may be used in the form of aqueous solutions or as pastes, but they must have incorporated with them various adjuncts suited to the cleansing of the particular object or surface in view. For cleansing interior or exterior walls consisting of stone or brickwork and tiles or glazed ware, painted or enamelled surface, etc., a weak solution of the "complex sulphonic acid" can be employed. For certain types of cleansing, for instance, metallic surfaces, the solution of the "complex sulphonic acid" or of its salt is mixed with an abrasive material such as whiting, pumice powder or the like, or the products may be put up in powder form for application with a wet cloth. In many cases it may be desirable to increase the cleansing action by adding an organic solvent such as benzene, naphtha, petroleum spirit, a chlorinated hydrocarbon, or the like. Various adjuncts commonly used in cleansing compositions may be added to improve the appearance of the composition prepared according to our invention or to assist in the manufacture of smooth or homogeneous products for the market, for example, soaps, sulphonated oils, thickening agents, tinting agents, etc.

In all cases the use of the "complex sulphonic acids" or their salts enables rapid and complete contact to be established with the surface to be cleansed or polished, and the result is a remarkable increase in effectiveness compared with ordinary methods.

The following examples illustrate the scope of the invention. The parts are by weight.

*Example 1.*—For tiles or scouring metal work a suitable mixture consists of 14 parts finely powdered pumice and 4 parts of the sodium salt obtained as described in co-pending Serial No. 195,585. The mixture is applied with water or the preparation may be used as a paste, e. g. 100 parts of the above mixture may be pasted up with 15 parts of water before use.

*Example 2.*—For tiles or scouring metal work a suitable mixture consists of 14 parts finely powdered pumice and 4 parts of the sodium salt obtained as described in co-pending Serial No. 205,833. The mixture is applied with water or the preparation may be used as a paste, e. g. 100 parts of the above mixture may be pasted up with 15 parts of water before use.

What we claim and desire to secure by Letters Patent is:—

1. As a new tile cleaning composition for cleansing tiles, walls, stoneware, glass, metals and painted and polished surfaces, comprising a sulphonated alkylated mineral oil fraction and mineral abrasive material.

2. As a new tile cleaning composition for cleansing tiles, walls, stoneware, glass, metals and painted and polished surfaces, comprising a sulphonated alkylated mineral oil fraction and mineral abrasive material and also containing a readily volatile liquid organic hydrocarbon solvent.

3. As a new tile cleaning composition for cleansing tiles, walls, stoneware, glass, metals and painted and polished surfaces, comprising a sulphonated alkylated mineral oil fraction and mineral abrasive material and a readily volatile liquid chlorinated hydrocarbon solvent.

4. As a tile cleaner for cleansing tiles, walls, stoneware, glass, metals and painted and polished surfaces, a composition of matter comprising a sulphonated fraction of a sulphur dioxide extract of mineral oil, a mineral abrasive and a readily volatile liquid organic hydrocarbon solvent.

5. As a tile cleaner for cleansing tiles, walls, stoneware, glass, metals and painted and polished surfaces, a composition of matter comprising a sulphonated fraction of an alkylated, sulphur dioxide extract of mineral oil, a mineral abrasive and a readily volatile liquid hydrocarbon solvent.

6. In the cleaning of tiles, walls, stoneware, glass, metals and painted and polished surfaces, the process which comprises applying to said surfaces a cleansing composition containing a sulphonated, alkylated fraction of a sulfur dioxide extract of mineral oil, mineral abrasive material and a chlorinated hydrocarbon.

In testimony whereof we affix our signatures.

JAMES BADDILEY.
ERNEST CHAPMAN.